Sept. 2, 1947.  W. E. McCULLOUGH  2,426,940
JOURNAL BEARING
Filed Oct. 22, 1943  2 Sheets-Sheet 1

INVENTOR.
William E. McCullough.
BY
Karl E. Lutz
ATTORNEY

Sept. 2, 1947.  W. E. McCULLOUGH  2,426,940
JOURNAL BEARING
Filed Oct. 22, 1943  2 Sheets-Sheet 2

INVENTOR.
William E. McCullough
BY
Karl B. Lutz
ATTORNEY.

Patented Sept. 2, 1947

2,426,940

UNITED STATES PATENT OFFICE 2,426,940

JOURNAL BEARING

William E. McCullough, Detroit, Mich.

Application October 22, 1943, Serial No. 507,274

2 Claims. (Cl. 308—242)

This invention relates to an improved journal bearing and to a method of manufacturing the same. The improved bearing can be used with particular advantage as a railway journal bearing, but it is capable of use wherever similar structures are required.

A feature of the invention resides in the formation of the journal bearing from an alloy of aluminum that is suitable for extruding and hot forging. The use of this material permits manufacture of the bearing in such a way as to produce favorable grain structure in the flange and lugs carried by the bearing, thus making these projections very strong and able to withstand the severe shocks to which they are subjected in service. In addition, the use of this material provides a bearing which has good bearing qualities and hence the journal liner can be made in one piece without any inner lining of babbitt or similar material. The aluminum alloy readily conforms to the shaft to give proper weight distribution, and due to its good thermal conductivity dissipates heat rapidly, thus keeping the temperature of the bearing low.

The invention also provides an improved method of manufacturing the bearing, by first extruding a blank having the general shape of the journal, that is, with a cross-section semi-circular in shape, and then forging the blank to produce such flanges and lugs as may be required to fit the particular installation.

These and other objects and advantages of the invention will become apparent as the description proceeds.

While preferred forms and methods are disclosed herein for purposes of illustration, it should be understood that various changes may be made without departing from the spirit of the invention as herein set forth and claimed.

As stated above, it is preferred to form the bearing from an alloy of aluminum that can be extruded and hot forged. These properties may be obtained with an alloy having the following approximate percentage composition:

Cu_____ 4.5
Mn_____ 0.75
Mg_____ 0.4
Fe_____ 0.75
Si_____ 0.8
Al_____ bal.

Figure 1:
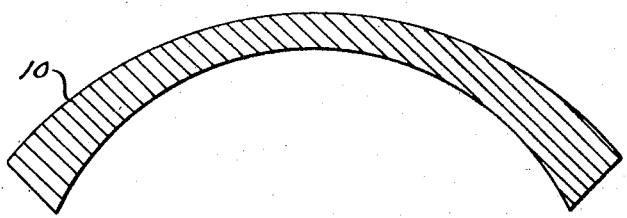
Fig. 1 is a cross-section of an extruded blank.

The first step in carrying out the invention is to extrude from the above, or some equivalent alloy, suitable mill lengths of strip having a shape corresponding roughly to the cross-sectional shape of the finished bearing. Thus, for the type of bearing illustrated in Figs. 2 to 4 the extruded strip preferably has the cross-sectional shape illustrated in Fig. 1, which is generally semi-circular with somewhat heavier walls at 10 in order to provide extra stock for lugs, as will be subsequently explained.

Those skilled in the art will understand that the extruded strip will have the malleable characteristics of worked metal and will have the "grain" of the metal running lengthwise of the strip.

Figure 2:
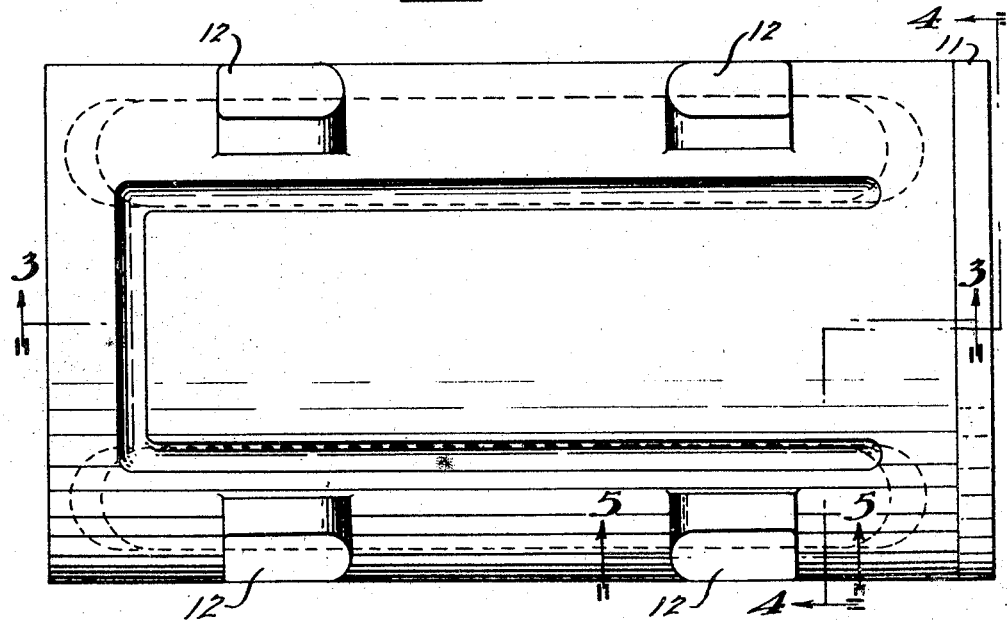
Fig. 2 is a plan view of a furnished bearing.
Figure 3:
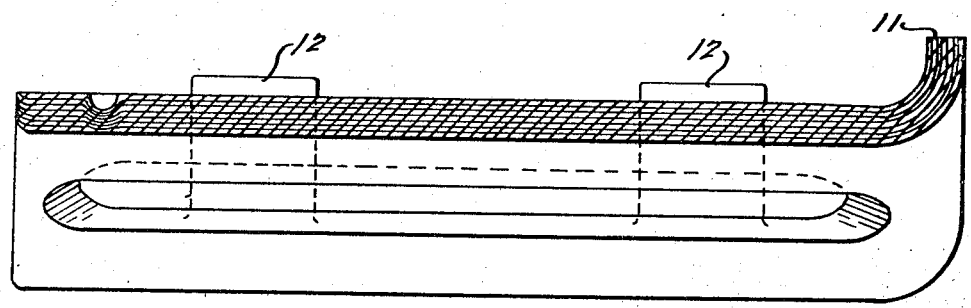
Fig. 3 is a longitudinal section on line 3—3 of Fig. 2.
Figure 4:
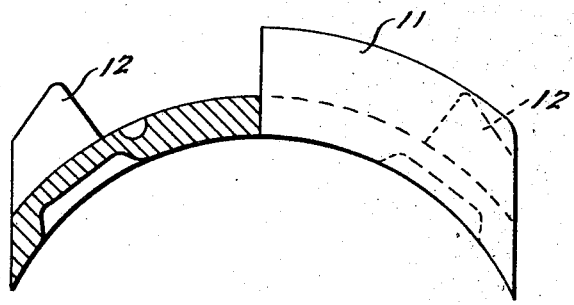
Fig. 4 is a view partly in elevation and partly in section on line 4—4 of Fig. 2.

The extruded strip is then cut up into suitable lengths to form bearing blanks, and by one or more forging operations the blank is transformed into the shape illustrated in Figs. 2 to 4. The forging bends the end of the blank up to form the flange 11, and lugs 12 are formed up along the edges of the bearing on its back.

Figure 5:
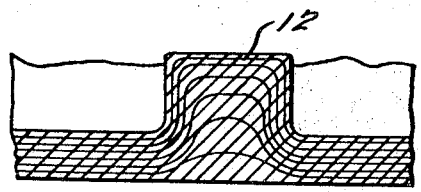
Fig. 5 is a section on line 5—5 of Fig. 2.

The forging operation bends the metal up to form flange 11 and lugs 12, and in doing so, changes the direction of the "grain" of the metal but causes the grain to run in directions that give these projections maximum strength and toughness. Thus in forming flange 11 the "fiber" or "grain" of the metal is bent around the radius where the flange leaves the body of the bearing and continues outwardly substantially parallel with the front face 13 and rear face 14 of the flange. This "grain" structure of the flange is illustrated in Fig. 3. In forming the lugs 11 the "fibers" are bowed outwardly into the lug as indicated in Fig. 5. As regards both the flange 11 and lugs 12 the "grain" of the main body of the bearing is merely bent at an angle and continues out into the projection without interruption.

This substantial continuity of grain gives these projections a strength and toughness that enables them to withstand the shocks encountered when the bearing is in actual service on the axle of railway rolling stock. These shocks tend to crack the flange and lugs away from the body of the bearing, and considerable trouble has been encountered in this regard in prior constructions, but the present invention overcomes these difficulties to a remarkable degree.

After the bearing has been forged it may be heat-treated to develop the desired physical properties. A desirable heat-treat is to heat the bearing in a fused sodium nitrate bath for 4 hrs. at 940° F.; quench it in cold water; then age it for 10 hrs. at 330° F.

A particular advantage of the forging operation is that the back of the bearing can be forged to the exact shape and size required so that no finishing operations by machining or otherwise need be performed on the back. The forging also gives the inner wall its approximate size, but due to the necessity for a smooth, accurately-contoured bearing face, this inner face is preferably machined prior to assembly on an axle.

The aluminum alloy described above after being subjected to the operations described has such good bearing qualities against steel that it can be used in direct contact with the railway axle without any intervening lining of babbitt or similar material. The ability of thus using the forged bearing direct without an added lining has advantages of economy in manufacture and security in operation that will be self evident to those skilled in the art.

It has been found that this aluminum alloy wears in smoothly and forms a good bearing surface conforming to the shaft. Also, due to the face that there is a solid mass of aluminum right down to the bearing surface, the frictional heat is rapidly carried away and dissipated, keeping the journal at desired low temperatures and preventing "hot boxes."

However, in certain installations, such as where the bearing will run against an extremely soft shaft it may be desirable to line the bearing with a layer of babbitt or other soft bearing material.

A difficulty common to cast leaded-bronze journal bearings consists of cracking and crumbling due to the alloy becoming weak when heated, as in the case of cotton waste becoming lodged between the journal and bearing face and causing a heated condition known as a "hot-box." In my invention, I avoid failures due to such local overheating through the substitution of a hot forging alloy to replace the hot-short and non-forgeable leaded-bronze bearing commonly used. It will be apparent that in the use of my forgeable aluminum alloy, its heating actually increases the plasticity of the bearing—thereby increasing its conformability, and permitting it to flow away from areas of high pressure without the cracking or crumbling that is typical of the cast leaded bronze currently in use.

While the invention has been disclosed as applied to a particular type of railway journal bearing, it can of course be applied to other shapes and types of bearings and can be used in other devices where plain bearings are required.

I claim:

1. A bearing formed of aluminum alloy having the approximate composition, Cu 4.5%, Mn 0.75%, Mg 0.4%, Fe 0.75%, Si 0.8%, balance Al; the material having been extruded, hot forged and heat-treated.

2. A bearing comprising a semi-cylindrical body having an outwardly-turned flange at one end and outwardly-extending lugs on its outer surface, the bearing being formed of aluminum alloy extruded and forged so as to have its grain running longitudinally of the body of the bearing and continuing without interruption outwardly into the flange and the lugs.

WILLIAM E. McCULLOUGH.

REFERENCES CITED

The following references are of record in the file of this patent:

UNITED STATES PATENTS

| Number | Name | Date |
|---|---|---|
| 2,270,988 | Woods | Jan. 27, 1942 |
| 2,266,276 | Schluchter et al. | Dec. 16, 1941 |
| 2,284,670 | McCullough | June 2, 1942 |
| 1,722,634 | Kinkead | July 30, 1929 |
| 2,170,039 | Steudel | Aug. 22, 1939 |
| 2,002,758 | Westhoff | May 28, 1935 |
| 1,400,829 | Oakley | Dec. 20, 1921 |
| 1,858,092 | Hybinette | May 10, 1932 |
| 1,899,631 | Norton | Feb. 28, 1933 |
| 2,249,349 | Deutsch | July 15, 1941 |

FOREIGN PATENTS

| Number | Country | Date |
|---|---|---|
| 434,022 | Great Britain | Aug. 20, 1935 |

OTHER REFERENCES

"Metals," Carpenter and Robertson, vol. I, 1939 Oxford University Press, N. Y. C.

"The Aluminum Industry," vol. II, first edition, 1930, Edwards, Frary and Jeffries—McGraw-Hill Book Co.